(12) United States Patent
Enomoto

(10) Patent No.: US 6,601,691 B1
(45) Date of Patent: Aug. 5, 2003

(54) CHIP CONVEYOR AND CHIP-SEPARATION/RECOVERY APPARATUS

(75) Inventor: Yukio Enomoto, Kakamigahara (JP)

(73) Assignee: Enomoto Industry Co., Ltd., Gifu (JP)

( * ) Notice: Subject to any disclaimer, the term of this patent is extended or adjusted under 35 U.S.C. 154(b) by 0 days.

(21) Appl. No.: 09/958,629

(22) PCT Filed: Apr. 12, 2000

(86) PCT No.: PCT/JP00/02370

§ 371 (c)(1),
(2), (4) Date: Oct. 11, 2001

(87) PCT Pub. No.: WO00/61331

PCT Pub. Date: Oct. 19, 2000

(30) Foreign Application Priority Data

| Apr. 14, 1999 | (JP) | 11-107226 |
| Feb. 24, 2000 | (JP) | 2000-48151 |
| Mar. 13, 2000 | (JP) | 2000-068857 |

(51) Int. Cl.⁷ .................................................. B65G 45/22
(52) U.S. Cl. ...................................................... 198/495
(58) Field of Search .................................. 198/493, 495

(56) References Cited

U.S. PATENT DOCUMENTS

| 2,525,348 A | * | 10/1950 | Glass | 198/495 |
| 3,270,860 A | * | 9/1966 | Siebach | 198/495 X |
| 3,998,321 A |   | 12/1976 | Schultz | 198/495 |
| 6,357,576 B1 | * | 3/2002 | Enomoto | 198/495 |

FOREIGN PATENT DOCUMENTS

| JP | 59-55645 | 4/1984 |
| JP | 61-191849 | 11/1986 |
| JP | 62-099048 A | 5/1987 |
| JP | 63-123656 A | 5/1988 |
| JP | 01-176412 A | 7/1989 |
| JP | 3-44540 | 4/1991 |
| JP | 3009783 | 2/1995 |
| JP | 7-17450 | 3/1995 |
| JP | 7-20234 | 4/1995 |
| JP | 09-075620 | 3/1997 |
| JP | 09-174376 | 7/1997 |
| JP | 10-058273 | 3/1998 |
| JP | 3055421 | 10/1998 |

* cited by examiner

Primary Examiner—James R. Bidwell
(74) Attorney, Agent, or Firm—Sheridan Ross PC (57) ABSTRACT

A chip conveyor (K) which receives chips delivered from a machine tool (MC) in a receiving area (R1) transfers chips to a delivery position a specified distance apart from the receiving area, and is provided with an endless carrier (18) rotatably in a specified direction to deliver chips at the delivery position, characterized in that a passage ranging from the receiving area to the delivery position is used as a go route (R2) for the carrier, a passage ranging from the delivery position back to the receiving position is used as a return route (R3) for the carrier, and a separating device (25) which separates chips from the carrier by allowing liquid to act on the chips adhering to the carrier which passes the delivery position so that their adhesiveness is reduced or eliminated is installed in the return route, whereby the residual chips can be removed efficiently from the carrier so as to increase the durability of the carrier and a drive mechanism.

33 Claims, 12 Drawing Sheets

CHIP CONVEYOR AND CHIP-SEPARATION/ RECOVERY APPARATUS

BACKGROUND OF THE INVENTION

This invention relates to a chip conveyor, which conveys cutting chips produced in the operation of a machine tool, such as a lathe or the like, from a receiving position to a discharge position, and a chip-separating/recovery apparatus used with the chip conveyor.

As a conventional chip conveyor, the chip conveyor disclosed in Japanese Unexamined Utility Model Publication No. Sho 59-55645 has been proposed. This chip conveyor includes a circulating conveying member and a bucket removably located at the discharge position of the chips. Chips containing cutting oil are conveyed by the conveying member to the discharge position, and just after the chips reach the discharge position, they are received by the bucket. A number of small holes for filtering the cutting oil are provided in the bottom portion of the bucket.

Further, air is sprayed from the outlet of nozzle on the lower surface of the conveying member so that chips that have adhered to the lower surface of the conveying member fall into the bucket. The cutting oil adhered to the chips is recovered through an oil recovery pipe from the number of small holes of the bucket.

However, in the above-mentioned chip conveyor, since the air sprayed through the nozzle has insufficient peel force, the chips adhered to the lower surface of the conveying member by oil cannot be reliably separated or recovered. Although the chips can be separated from the conveying member by increasing the air pressure through the nozzle, not only is a special structure for preventing the flying of chips is needed, but also a supply source for a high-pressure fluid is needed.

On the other hand, the present applicant proposed a chip conveyor disclosed in Japanese Unexamined Patent Publication No. Sho 63-123656. In this chip conveyor, an endless type mesh belt is provided inside a horizontal frame and an inclined frame. The horizontal frame is arranged in a chip-receiving region, and chips from a machine tool are introduced onto the horizontal frame. Then, the conveyor belt is circulated within and along the horizontal frame and the inclined frame and the chips introduced onto the horizontal frame are conveyed to the upper end of the inclined frame, and the chips are discharged from the chip conveyor.

Further, a spraying member is arranged between the upper and lower traveling portions of the mesh belt in the horizontal frame. By spraying coolant toward the lower traveling portion of the mesh belt, the lower traveling portion of the mesh belt is cleaned. A recovery tank for recovering the coolant adhered to the belt and fine chips is arranged on the inclined frame.

However, in this chip conveyor also, the chips cannot be reliably removed by only spraying the coolant on the mesh belt. Further, not only is a special structure for preventing the flying of coolant and chips needed, but also a supply source for a high-pressure fluid is needed.

Even when the conveying member of the belt and the like passes through the chip-discharge position, if a piece of a chip is adhered to the conveying member, the chip can enter between sliding parts forming the conveying member to wear the parts. Further, the chip can enter between sliding parts of a mechanism that drives the conveying member, which will decrease the life of the driving mechanism.

Moreover, when the remaining chips fall and accumulate in the receiving position, the accumulated chips must be manually removed, which is troublesome.

Further, Japanese Unexamined Utility Model Publication No. Sho 61-191849 describes a cutting-water separation apparatus used for a machine tool. This separation apparatus includes a tank for receiving chips from the machine tool, a chip conveyor for discharging the chips from the tank, a supporting plate, which receives cutting water dropping from the vicinity of a head pulley of the chip conveyor, and a pipe for recovering the cutting water dropped on the supporting plate.

When the endless conveying member of the chip conveyor is moved along a forward route from the tank to the head pulley, it conveys chips from the tank to the head pulley and drops the chips from the head pulley. Further, when the endless conveying member is moved along a return route from the head pulley to the tank, cutting water, which drops from the head pulley, is returned back to the tank through the supporting plate, the pipe, and the hose.

However, in this separation apparatus, it is hardly possible to recover chips that adhere to the conveying member. The supporting plate and pipe are used for recovery of only a small amount of cutting water, and the cutting water dropped on the supporting plate is collected into the pipe along the inclination of the supporting plate. The cutting water is not used for the separation of remaining chips adhered to the conveying member.

All of the chips put on the chip conveyor from the tank in the receiving position are not dropped into a recovery box from the chip conveyor in the discharge position, and some of the chips adhere to the conveyor by liquid crosslinking adhesion and are returned to the receiving position. The returned chips accumulate in the tank in the receiving position. In a case of aluminum machining, the rate of returned chips is more than 50%, which is a large amount, and the tank is immediately filled with the chips. In this case, after the operation of the machine tool is stopped and the cutting water is drained from the machine tool, the chips must be removed from the tank, which is troublesome.

In addition, since the chips accumulated in the tank are discharged, it is possible to use a screw conveyor. However, since the tank is usually provided on the ground, it is necessary to form an underground pit by an excavating operation to install the screw conveyor, which greatly increases the operating cost.

To prevent the provision of an underground pit, the tank may be located at a position higher than the ground. However, in this case, the machine tool itself, other than the tank, must also be located at a position higher than the ground, which also increases costs greatly. Further, the working position of workpieces becomes higher than necessary and the operation becomes inconvenient.

This invention has been made to solve the abovementioned problems. The object of the present invention is to provide a chip conveyor that can separate and recover chips remaining on a conveying member in the forward route so that the durability of the conveying member and the driving mechanism is improved, which improves the degree of freedom in locating the remaining chip separation apparatus to simplify the provision of the separation apparatus.

Further, in addition to the above object, another object of the present invention is to provide a chip separation/recovery apparatus the construction of which is simplified so that attachment and detachment operations with respect to a discharge portion of the chip conveyor is simplified.

BRIEF SUMMARY OF THE INVENTION

To attain the above-mentioned object, in a preferred embodiment of the present invention, a chip conveyor is provided, in which chips discharged from a machine tool are received in a receiving region, the chips are conveyed to a discharge position spaced by a predetermined distance from the receiving region, and an endless conveying member is located for discharging the chips at the discharge position such that the conveying member can be circulated in a predetermined direction. In this chip conveyor a path from the receiving region to the discharge position is defined as a forward route of the conveying member. A path from the discharge position where returned to the receiving region is defined as a return route of the conveying member. A separation apparatus for separating chips from the conveying member is provided in the return route, and the separation apparatus causes a liquid to act on chips adhered to the conveying member after passing through the discharge position to reduce or remove the adhesion.

In another embodiment of the present invention, a chip separation/recovery apparatus used in the chip conveyor is provided. The apparatus includes a liquid storage tank containing a liquid, through which a conveying member passes on the return route of the conveying member, and a mechanism, which is provided in the liquid storage tank and which causes the conveying member to detour.

DETAILED DESCRIPTION OF THE PREFERRED EMBODIMENTS

BEST MODE FOR CARRYING OUT THE INVENTION

One embodiment, in which the present invention is embodied in a chip conveyor used in a machine tool, will now be described with reference to FIGS. 1 to 4.

Figure 4:
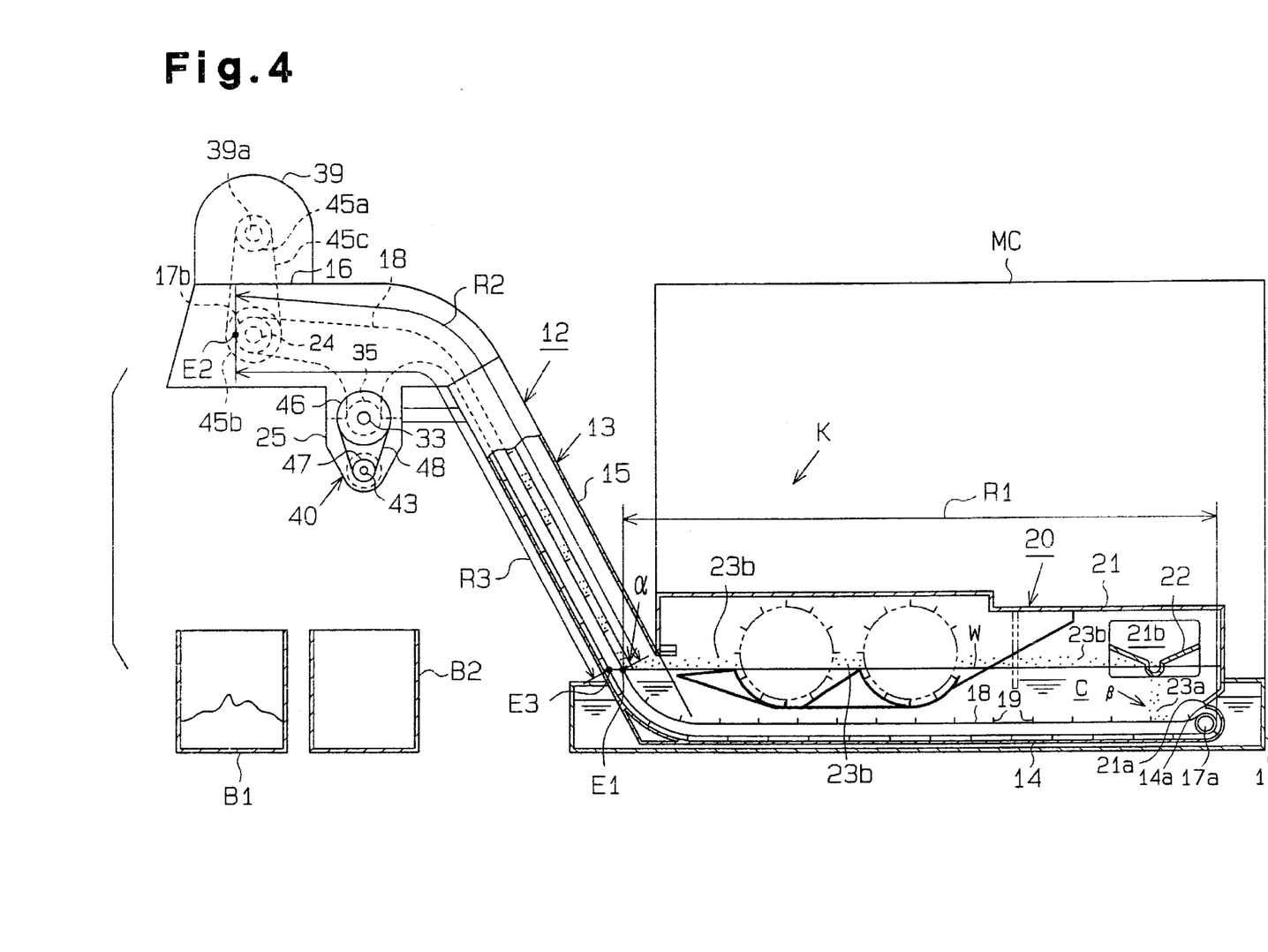
FIG. 4 is a cross-sectional view showing an entire chip conveyor.

FIG. 4 shows an entire chip conveyor K. A machine tool MC is located on a side of the chip conveyor. When a cutting operation of an article is carried out by the machine tool, chips are produced. The chip conveyor K is mounted on a floor surface so that the chips can be recovered from the machine tool and conveyed to another position.

At a chip receiving position, a recovery tank 11 within which a water-soluble or oily coolant liquid C is stored. The lower horizontal portion of a conveyor body 12 is provided in the recovery tank 11. A trough 13 of the conveyor body 12 includes a recovery portion 14, which extends horizontally in the recovery tank 11, a raised portion 15, which extends obliquely upward from the recovery portion 14, and a discharge portion 16, which extends substantially horizontally from the upper end of the raised portion 15 to a discharge position.

Sprocket wheels 17a and 17b are rotatably supported in the recovery portion 14 and the discharge portion 16 of the trough 13, respectively, and an endless type conveying member 18 is looped between the sprocket wheels 17a and 17b. A plurality of conveying scrapers 19 are provided on the outer surface of the conveying member 18 and spaced apart by predetermined distances.

As shown in FIG. 4, a motor 39 is fixed to the upper surface of the discharge portion 16, and on the output shaft 39a of the motor 39, a drive sprocket wheel 45a is provided. On a supporting shaft 24, which supports the sprocket wheel 17b, a driven sprocket wheel 45a is provided. A chain 45c is looped over the drive sprocket wheel 45a and the driven sprocket wheel 45b. The conveying member 18 is driven by the motor 39 and the conveying member 18 counterclockwise along the recovery portion 14, the raised portion 15 and the discharge portion 16, as shown by an arrow in FIG. 4.

Above the conveying member 18, a separation apparatus 20 is provided on the recovery portion 14 of the trough 13. A lower opening 21a of the casing 21 forming the separation apparatus 20 communicates with an upper opening 14a of the recovery portion 14. An introduction inlet 21b of the casing 21 is formed in the side wall on an upstream side of the casing 21, and into the introduction inlet 21b is inserted the downstream end of a trough 22 extending from the machine tool into the casing 21. A coolant liquid C containing the chips 23 discharged from the machine tool flows into the casing 21 through the trough 22. The chips 23 include heavy chips 23a, which fell into the lower portion from the liquid level W of the coolant in the casing 21, and light chips, which floats on the liquid level W of the coolant. The floating chips 23b are recovered by the conveying member 18 at a position a where the conveying member 18 in the raised portion 15 crosses the coolant liquid level W. Further, the fallen chips 23a are recovered by the conveying member 18 at a position β where the conveying member 18 faces the trough 22.

A separation/recovery apparatus attached to the lower side of the discharge portion 16 will now be described.

In this embodiment, as shown in FIG. 4, the chips 23 are discharged into the recovery tank 11 located relative to the machine tool MC from the machine tool through the trough 22. The receiving region of the chips 23 extends horizontally along the machine tool MC and is set to a given length. A part of the conveying member 18 is arranged on the receiving passage in this receiving region R1. Further, the forward route R2 of the conveying member 18 includes a region from a point E1, which is located at an end of the receiving passage where the discharge of chips is started from the recovery tank 11, to a point E2, where the conveying member 18 is turned back by the sprocket wheel 17b. Further, a region where the conveying member 18 is turned back from the turning point E2 to the starting point E3 of the receiving passage is defined as a return route R3. The forward route R2 and the return route R3 are substantially parallel.

The discharge portion 16 includes a pair of side walls 26, 26, which support a supporting shaft 24 of the sprocket wheel 17b, and the respective ends and the lower sides of the both side walls 26, 26 are opened. Some of the chips conveyed by the conveying member 18 fall down from the conveying member 18 as it turns at the opening of the end portion as shown by an arrow in FIG. 1, and are recovered by the recovery box B1 shown in FIG. 4.

Figures 1, 3:
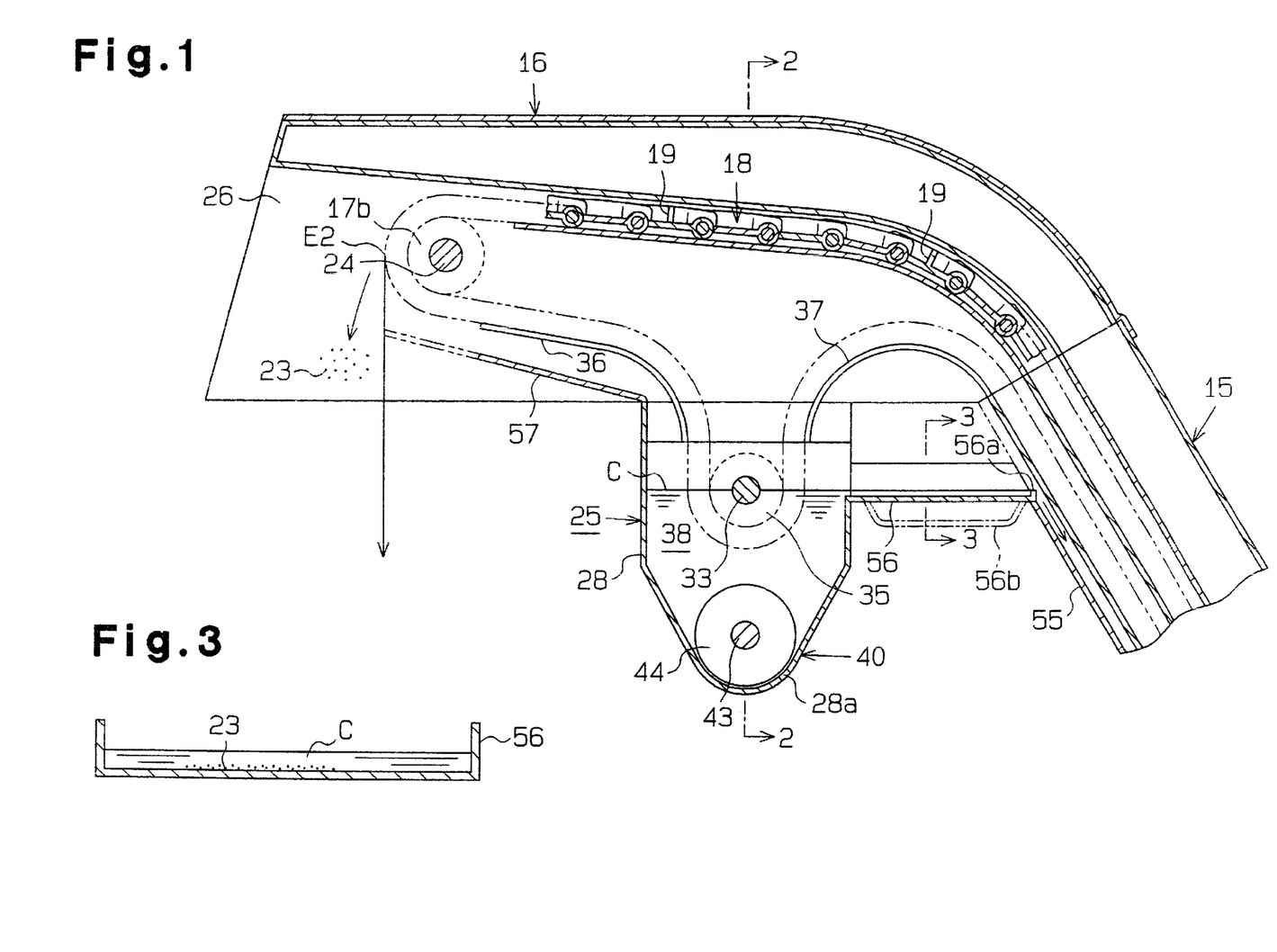
FIG. 1 is a cross-sectional view showing a chip separation/discharge apparatus in which this invention is embodied.
FIG. 3 is a cross-sectional view taken along the line 3—3 of FIG. 2.

To the lower end portions of the side walls 26, 26 is attached the separation/recovery apparatus 25, which separates and recovers chips 23 that adhere to the conveying member 18 and have not fallen. The separation/recovery apparatus 25 includes a liquid storage tank 28. To the outsides of the side walls 26, 26 are fixed flange metal fittings 27, 27 by welding or the like. To the liquid storage tank 28 are welded flange metal fittings 29, 29. In addition, the liquid storage tank 28 is fixed to the side walls 26, 26 by fastening the flange metal fittings 27, 27 and the flange metal fittings 29, 29 with a bolt 30 and a nut 31.

The liquid storage tank 28 has a laterally elongated triangular tubular shape, and the top surface of the liquid storage tank 28 is opened toward the lower surface of the discharge portion 16. The lower portion of the liquid storage tank 28 is focused to a triangular (tapered) shape in cross section and the lower end thereof is arcuate in cross section.

Figure 2:
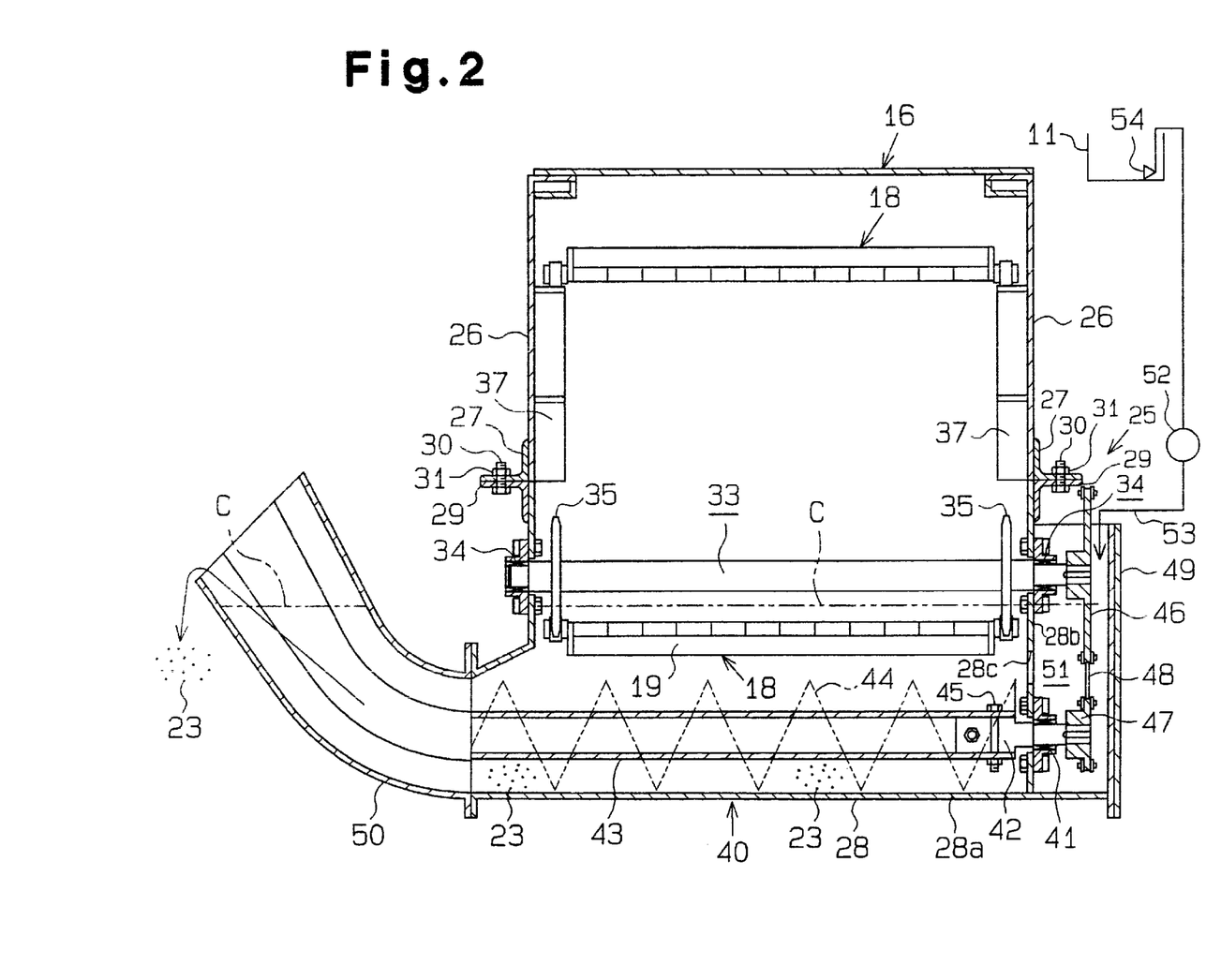
FIG. 2 is a cross-sectional view taken along the line 2—2 of FIG. 1.

To the liquid storage tank 28 is rotatably supported a support shaft 33 through bearings 34, 34, and to this support shaft 33 are attached a pair of sprocket wheels 35, 30 35 for routing the conveying member into the liquid storage tank 28. On the inside surface of the side walls 26, 26 are provided guide flanges 36, 37 for guiding the circulation of the side edges of the conveying member 18. It is noted that in this embodiment a detouring mechanism of the conveying member 18 is formed by the support shaft 33, bearings 34, 34, and sprocket wheels 35, 35.

The coolant liquid C is stored in the internal space 38 of the liquid storage tank 28. Chips 23 adhered to the conveying member 18 are separated by immersing the conveying member in the coolant liquid C while detouring the conveying member 18 therein. Separated chips 23 fall to the bottom portion of the liquid storage tank 28. As a device for discharging the fallen chips, a screw conveyor 40 is attached to an arcuate portion on the lower end of the liquid storage tank 28.

The conveyor 40 will be described. A discharge trough 28a is formed on the lower portion of the liquid storage tank 28 parallel to the support shaft 33. A rotating shaft 42 is supported on one side wall 28b of the liquid storage tank 28 relative to this trough 28a, and an impeller wheel 44 is fixed to the outer periphery of a mounting shaft tube 43, which is fitted to the rotating shaft 42 by welding. A pin 45 connects the rotating shaft 42 and the mounting shaft tube 43. To the outer end of the support shaft 33 is mounted a drive sprocket wheel 46 and to the outer end of the rotating shaft 42 is fitted and fixed a driven sprocket wheel 47. A chain is looped over the sprocket wheels 46, 47.

An outer periphery of the end portion of the impeller wheel 44 for the screw conveyor 40 is restricted in terms of the position by an inner peripheral surface of a discharge tube 50 having a cylindrical cross section.

On the outside wall of the liquid storage tank 28 is an auxiliary liquid storage tank 49 for housing the sprocket wheels 46, 47, the chain 48 and the like. On the opposite side of the auxiliary liquid storage tank 49, the discharge tube 50 is attached to extend obliquely upward to an outer side wall of the liquid storage tank 28, and the discharge tube 50 is connected to the discharge trough 28a. The level of an opening of the end of this discharge tube 50 is higher than the liquid level of the coolant liquid C in the liquid storage tank 28.

As shown in FIG. 2, the internal space 38 of the liquid storage tank 28 communicates with the internal space 51 of the auxiliary liquid storage tank 49 through an opening 28c formed in the side wall 28b. A cleaner 54 is provided in the recovery tank 11. The coolant liquid in the recovery tank 11 is cleaned by the cleaner 54, and supplied from a pump 52, which is a liquid replenishing device, and a pipe 53 to the internal space 51 of the auxiliary liquid storage tank 49.

As shown in FIG. 1, a discharge trough 56 that extends substantially horizontally bridges between a chute 55 forming the raised portion 15 and the liquid storage tank 28 for discharging the coolant liquid C in the liquid storage tank 28. When the coolant liquid C is returned to the recovery tank 11, the discharge trough 56 is used as a precipitating/recovery apparatus, which removes fine chips 23 contained in the coolant liquid on the bottom of the discharge trough 56 and also recovers them.

The discharge trough 56 is provided with an end-plate 56a, which prevents the fine chips 23 from moving toward the chute 55. A dish-shaped concave portion 56b is provided on the bottom portion of the discharge trough 56, as shown by a chain line in FIG. 1, whereby the amount of fallen chips 23 can be increased.

As shown in FIG. 1, a guide 57 is arranged between the liquid storage tank 28 and the sprocket wheel 17b, and the side edges of the guide 57 are fixed to the side walls 26, 26 by welding or the like. The distal edge of the guide 57 is shifted from the sprocket wheel 17b toward the liquid storage tank 28 to be located under the conveying member 18. Thus, the guide 57 leads chips 23 and coolant liquid C that have passed through the sprocket wheel 17b and fallen through the conveying member 18 into the liquid storage tank 28.

Although the position of the distal edge of the guide 57 may be as shown by a solid line in FIG. 1, the distal edge may be located in the vicinity of a vertical line passing through the turning point E1 of the conveying member 18, as shown by a chain line. In this case, a larger amount of coolant liquid C can be led to the liquid storage tank 28 along the guide 57, and the amount of coolant liquid that falls into the recovery box B1 is decreased.

Next, the operations of the chip conveyor constructed as mentioned above will be described.

As shown in FIG. 4, when the coolant liquid C containing chips 23 flows into the casing 21 through the trough 22 from the machine tool, heavy chips 23a fall in the vicinity of the receiving position β and are recovered between the respective scrapers 19. On the other hand, light chips 23b float on the coolant liquid at the liquid level W. When the conveying member 18 is raised from the liquid level W, the light chips 23b are collected by the scraper 19. Then, the heavy chips 23a and light chips 23b are conveyed by the conveying member 18 and they are moved upward in the raised portion 15 to reach the opening of the discharge portion 16. When the conveying member 18 passes through the sprocket wheel 17b and returns, comparatively heavy chips 23a fall down from the conveying member 18 and are recovered by the recovery box B1.

Further, even when the conveying member 18 passes around the sprocket wheel 17b, some of the heavy chips 23a and light chips 23b are moved into the liquid storage tank 28 of the separation/recovery apparatus 25 while adhering to the conveying member 18 and are immersed in the coolant liquid C. Here, the chips 23 are separated by the coolant liquid C and fall to the discharge trough 28a.

On the other hand, as shown in FIG. 2, since the support shaft 33 is rotated by the circulation of the conveying member 18, the impeller wheel 44 of the screw conveyor 40 is rotated through the drive sprocket wheel 46, the chain 48, the driven sprocket wheel and the rotating shaft 42. The impeller wheel 44 transports the chips 23 within the discharge trough 28a toward the discharge tube 50. The chips 23 that have fallen from the discharge tube 50 are recovered in the recovery box B2 shown in FIG. 4.

The chip separation/recovery apparatus 25 constructed as described above has the following effects.

(1) In the above-mentioned embodiment, in the return route R3 of the conveying member 18, the liquid storage tank 28 is attached to the lower portion of the discharge portion 16, a liquid such as the coolant liquid C or the like is stored in the liquid storage tank 28, and the conveying member 18 is configured to be advanced into the liquid. Thus, the liquid in the liquid storage tank 28 acts on chips adhered to the conveying member 18 so that the adhesion is decreased or removed, and the chips 23 are efficiently separated from the surface of the conveying member 18 in the liquid storage tank 28.

Further, since the liquid storage tank 28 and screw conveyor 40 are provided in the return route R3 of the conveying member 18, as compared with a case where they are provided under the recovery tank 11, an excavated underground pit is not required. Therefore, the degree of freedom in locating the separation/recovery apparatus is improved and the installation thereof can be easily carried out.

Here, the principle of separating chips 23 from the surface of the conveying member 18, will be explained. It is assumed that the chips 23 are aluminum particles, and the aluminum particles are adhered to the surface of the conveying member 18 through an oil component contained in the coolant liquid. In this state, liquid crosslinking adhesion by oil and van der Waals force act between the conveying member 18 and the aluminum particles, so that the aluminum particles are adhered to the conveying member 18 by both forces. The liquid crosslinking adhesion is significantly larger than the van der Waals force with respect to the entire particle diameters. Thus, when the entire aluminum particles are exposed to the coolant liquid, the liquid crosslinking adhesion is eliminated and the particles can be in a state where they are adhered to, the conveying member by only the Van der Waals force. The van der Waals force is likely to be influenced by the surrounding environment, and the magnitude of the var der Waals force is further significantly reduced when the surrounding environment is air rather than liquid. As described above, the aluminum particles are efficiently separated from the conveying member 18 by exposing the aluminum particles to the coolant liquid., (2) In the embodiment, as the discharge device for discharging chips 23 fallen on the lower portion of the liquid storage tank 28, the screw conveyor 40 was provided. Therefore, the chips 23 can be automatically discharged.

(3) In the embodiment, the circulating movement of the conveying member 18 is used as the driving force of the screw conveyor 40. Thus, it is not necessary to additionally provide an exclusive driving source, and the structure can be simplified.

(4) In the embodiment, the discharge trough 56 was provided between the liquid storage tank 28 and chute 55. Thus, in a process where the coolant liquid is discharged from the liquid storage tank 28 to the chute 55 through the discharge trough 56, fine chips 23 contained in the coolant liquid fall on the bottom surface of the discharge trough 56 by setting the flow rate of the liquid at about 0.1 to 1 m/min. As a result, the recovery of fine chips 23 can be carried out, and at the same time no clogging of the cleaner 54, which separates the coolant liquid in the recovery tank 11, occurs, and the maintenance can be easily conducted. It is noted that the slower the flow rate of the coolant liquid is, the more reliably the falling of fine chips is carried out.

(5) In the embodiment, the distal end portion of the discharge portion 16 is opened and the chips 23 are caused to fall naturally. The chips 23 that do not fall are separated by the chip separation/recovery apparatus 25. Accordingly, the supply of the coolant liquid C supplied to the liquid storage tank 28 can be set to the minimum necessity.

(6) In the embodiment, the auxiliary liquid storage tank 49 is attached to the side portion of the liquid storage tank 28, and the auxiliary liquid storage tank 49 communicates with the liquid storage tank 28. Therefore, the storage volume of the coolant liquid C is increased. Further, the sprocket wheels 46, 47 and the bearings 34, 41 are located in the auxiliary liquid storage tank 49. Thus, it is not necessary to exclusively provide a seal structure in the bearings 34, 41, and the structure can be simplified.

(7) In the embodiment, the coolant liquid C is supplied to the auxiliary liquid storage tank 49, and clean coolant liquid is supplied into the auxiliary liquid storage tank 49. Thus, the durability of the present apparatus is improved since chips do not enter the driving mechanism of the screw conveyor 40.

(8) In the embodiment, the level of the end opening of the discharge tube 50 is higher than the level of the coolant liquid C in the liquid storage tank 28. Thus, the amount of coolant liquid adhered to chips 23 discharged from the discharge tube 50 is reduced.

(9) In the embodiment, the chip separation/recovery apparatus 25 includes the liquid storage tank 28 containing liquid in which the conveying member 18 is immersed and passes through in the return route, and the sprocket wheels 35, 35 provided in the liquid storage tank 28 are used as a detour mechanism which detours the conveying 30 member 18 to reverse movement. In addition, the chip separation/recovery apparatus 25 is removably located under the discharge portion 16. Therefore, the configuration of the chip separation/recovery apparatus 25 is simplified and the attachment and detachment operations are easily carried out.

The embodiment can be modified and embodied as follows. In the following embodiments, members having the same functions in the above-mentioned embodiment are denoted with the same reference numerals, and explanations thereof will be omitted.

Figure 5:
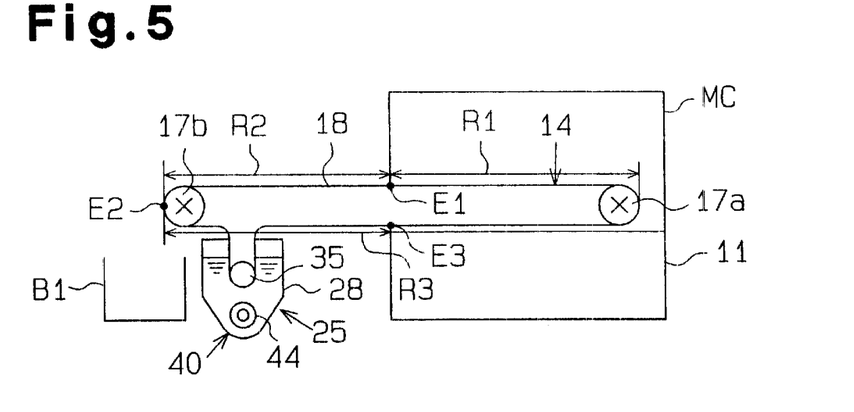
FIG. 5 is a schematic front view showing another embodiment.

As shown in FIG. 5, the conveying member 18 is substantially horizontal and the recovery tank 11 is located under the receiving region R1, so that the separation/recovery apparatus 25 for chips 23 may be attached in the vicinity of the discharge portion and spaced from the receiving region R1. In this case, the same effects as in the above-mentioned embodiment are also obtained.

The recovery tank 11, which stores the coolant liquid, is omitted and cutting oil and chips are caused to directly fall on the upper surface of the conveying member 18, so that the chips may be conveyed to the discharge position. In this case, it is not necessary to provide the chip separation/recovery apparatus 25, thus the degree of freedom in locating the entire apparatus is increased.

Figure 6:
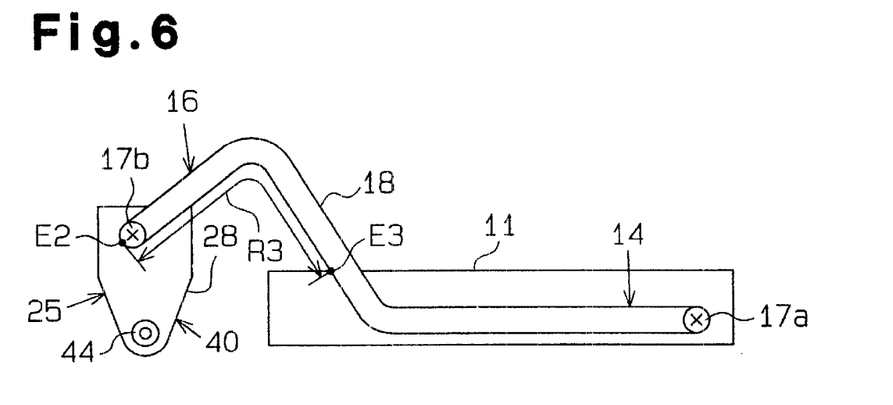
FIG. 6 is a schematic front view showing another embodiment.

As shown in FIG. 6, the discharge portion 16 the distal end portion of the conveying member 18 can be housed in the liquid storage tank 28 of the chip separation/recovery apparatus 25. In this case, all chips 23 on the conveying member 18 can be recovered in the liquid storage tank 28, and the structure shown in FIG. 6 can be further simplified as compared with that of the embodiment shown in FIG. 4.

Figure 7:
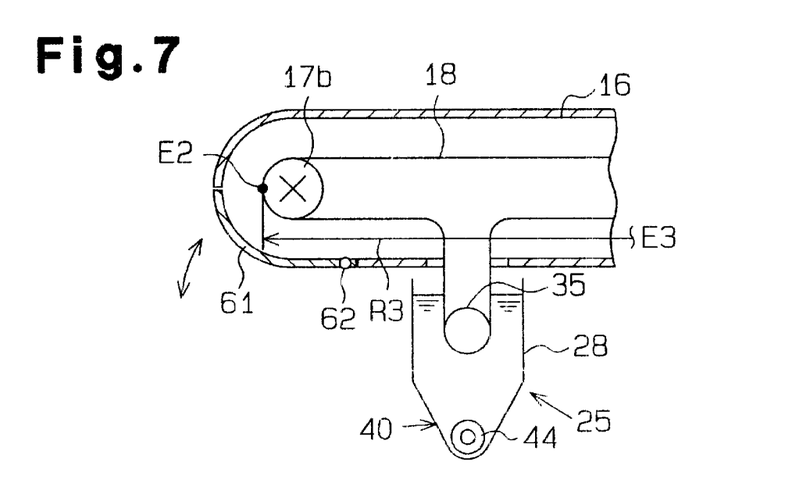
FIG. 7 is a main portion cross-sectional view showing another embodiment.

As shown in FIG. 7, a cover 61 is rotatably supported by a shaft 62 in the distal end portion of the discharge portion 16, and the rotation position of the cover 61 is controllably supported, so that the size of the opening may be controlled by the cover 61. In this case, when separation and recovery of chips which are difficult to fall down naturally from the conveying member 18 are performed, the cover is closed, and when chips which are easy to fall down naturally are discharged, or maintenance therefor is conducted, the cover 61 can be opened.

Figure 8:
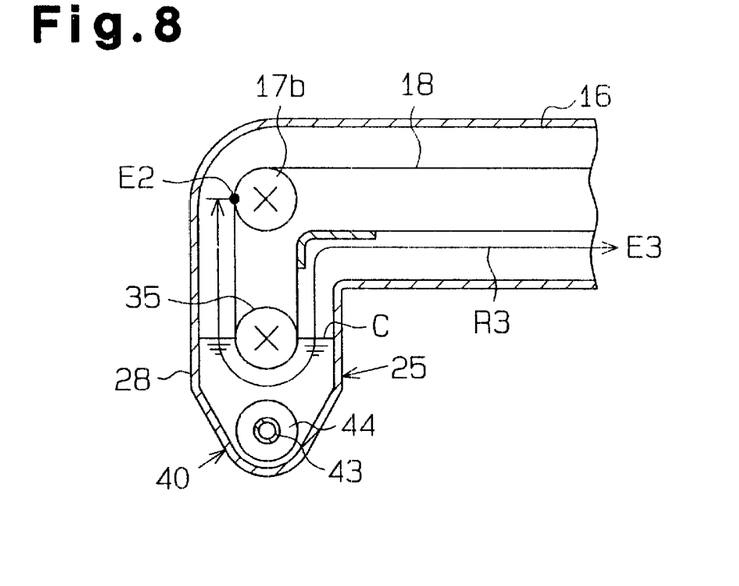
FIG. 8 is a main portion cross-sectional view showing another embodiment.

As shown in FIG. 8, a configuration in which the discharge portion 16 is sealed tightly and the discharge portion 16 is provided with the chip separation/recovery apparatus 25, may be used. In this case, all chips 23 on the conveying member 18 are recovered in the liquid storage tank 28, and the structure of the apparatus is further simplified as compared with the embodiment in FIG. 4.

Figure 9:
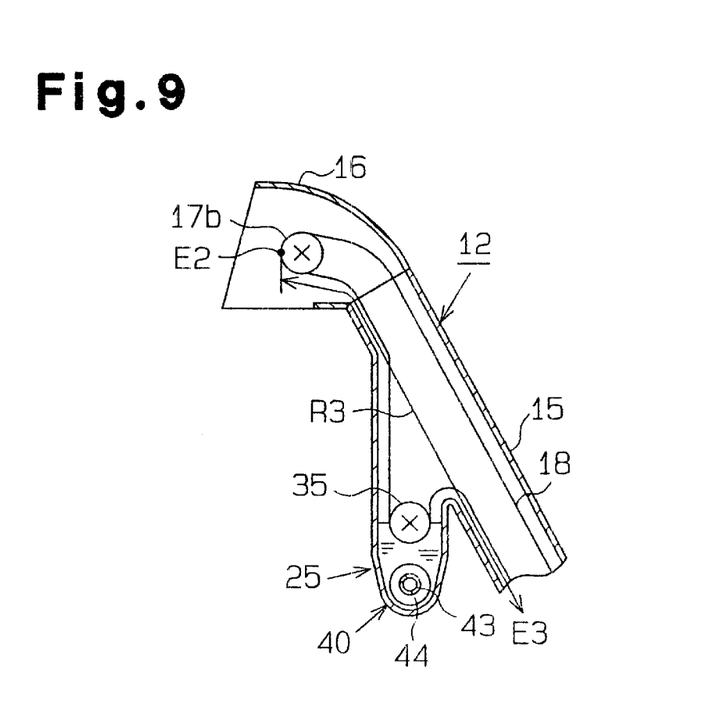
FIG. 9 is a main portion cross-sectional view showing another embodiment.

As shown in FIG. 9, the chip separation/recovery apparatus 25 may be attached to the middle of the raised portion 15. In this case, space under the raised portion 15 can be effectively utilized.

Figure 10:
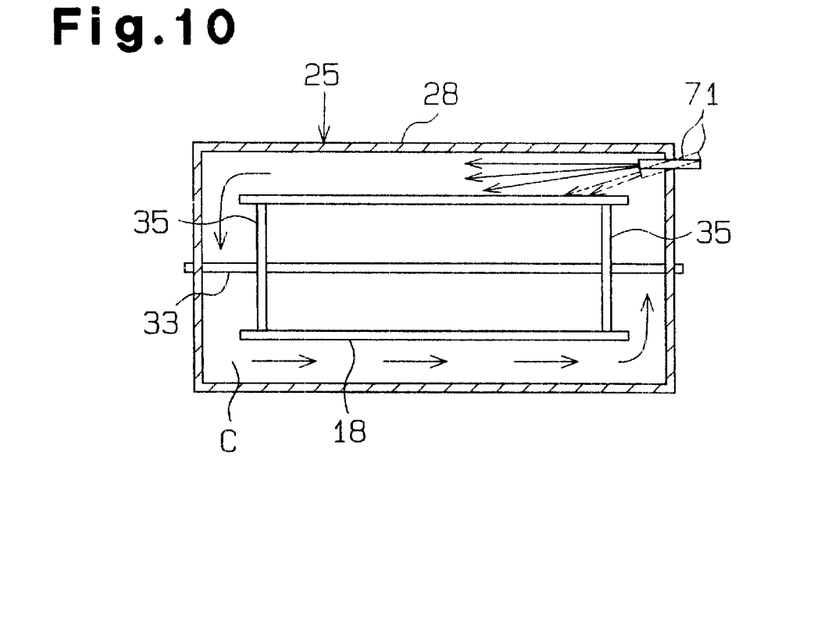
FIG. 10 is a main portion cross-sectional view showing another embodiment.

As shown in FIG. 10, a supply nozzle 71 for the coolant liquid C is arranged so that liquid C is directed both perpendicular to and in the movement direction of the conveying member 18 in the liquid storage tank 28, so that a circulating flow is produced in the liquid storage tank 28, and the coolant liquid C in the liquid storage tank 28 is agitated. Alternatively, the coolant liquid C may be agitated by a screw. In this case, kinetic energy is applied to the coolant liquid C in the liquid storage tank. Thus, a shearing force is imparted to the oil that adheres aluminum particles to the conveying member, and the separation of aluminum particles from the conveying member 18 is reliably performed.

Figure 11:
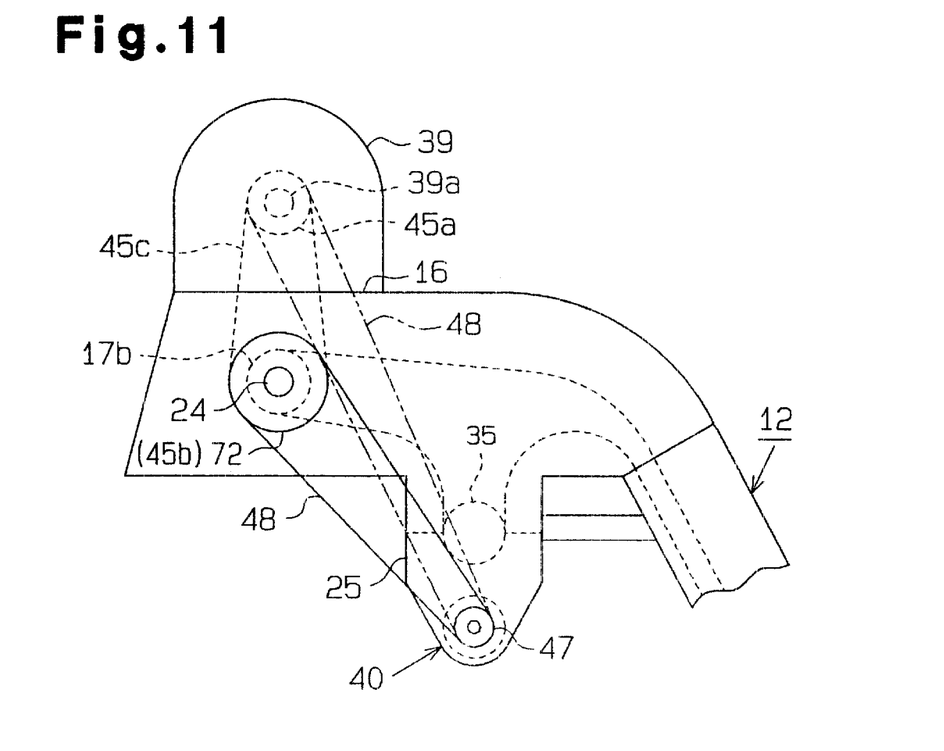
FIG. 11 is a main portion front view showing another embodiment.

As shown in FIG. 11, another sprocket wheel 72, which is different from the driven sprocket wheel 45b, is fitted to the outer end portion of the supporting shaft 24, and the chain 48 may be looped over the sprocket wheel 72 and the sprocket wheel 47. Alternatively, the drive sprocket wheel 45a is changed to double wheels, and the chain may be looped over one of the double wheels and the driven sprocket wheel 47, as shown by a chain line in FIG. 11. In any case, the rotation of the screw conveyor 40 is properly conducted in synchronization with the rotation movement of the motor 39. As a result, the discharge operation of chips is smoothly carried out.

Further, since a common motor 39 can be used for the conveying member 18 and the screw conveyor 40, when an overload acts on the motor 39 through the conveying member 18 and the screw conveyor 40, safety mechanisms to remove the overload can be unified and the configuration of the control circuit of the motor 39 can also be simplified.

The screw conveyor 40 may be driven by an independent, exclusive motor. In this case, the discharge operation of the chips 23 can be properly effected by an actuating signal of the control device according to the amount of discharged chips.

Figure 12:
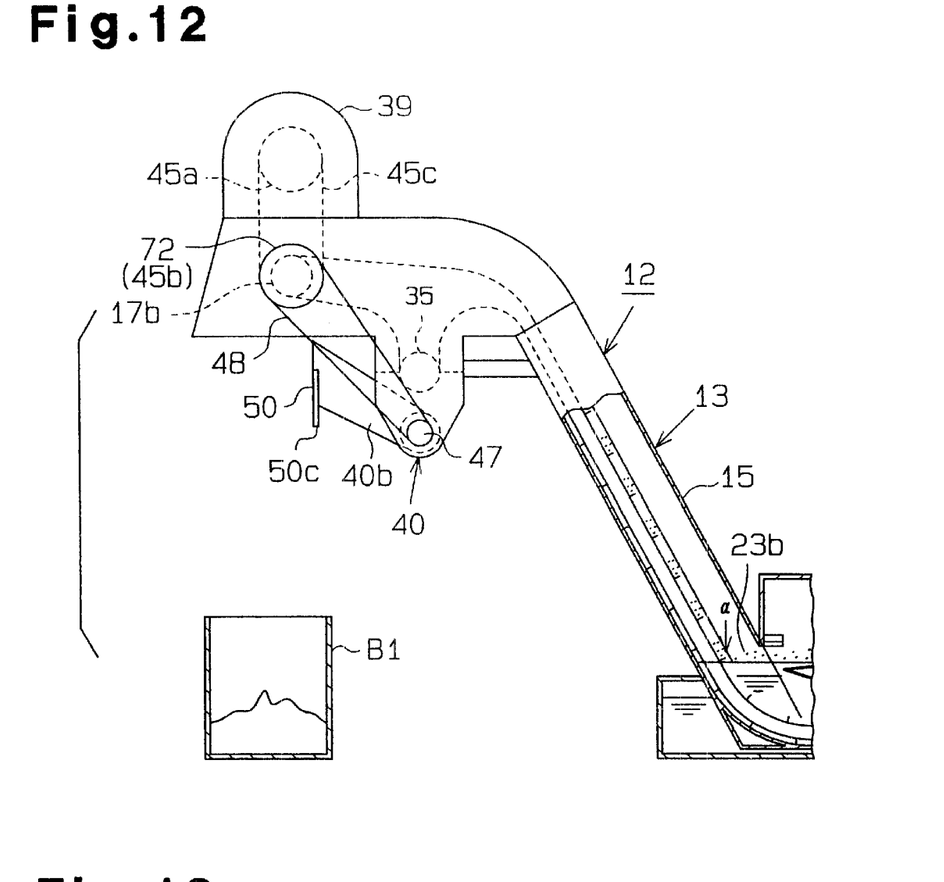
FIG. 12 is a main portion front cross-sectional view showing another embodiment.
Figure 13:
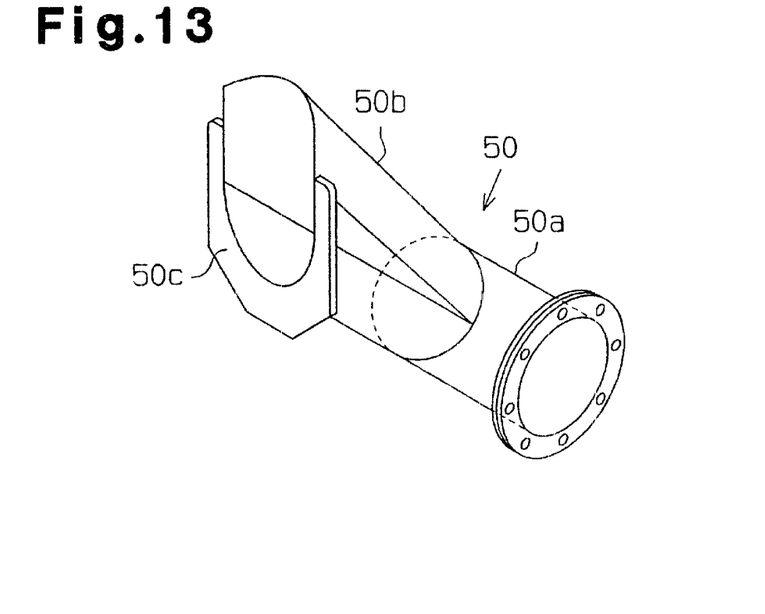
FIG. 13 is a perspective view of a discharge tube used in the embodiment of FIG. 12.

In place of the discharge tube 50 shown in FIG. 2, an elbow-shaped discharge tube 50 may be used as shown in FIGS. 12 and 13. The elbow-shaped discharge tube 50 includes a first portion 50a extending horizontally and a second portion 50b extending obliquely upward from the first portion 50a. The second portion 50b is formed in a bugle shape so that the distal end has a larger passage surface area. A chip guide plate 50c is attached to an opening edge of the second portion 50b and is arranged above the recovery box B1. Thus, in this case, it is not necessary to provide the recovery box for the conveying member 18 and the screw conveyor 40, respectively, and the chips 23 discharged from the discharge tube 50 and conveying member 18 can be recovered by a single recovery box B1, and the recovery box B2 can be omitted.

Figure 14:
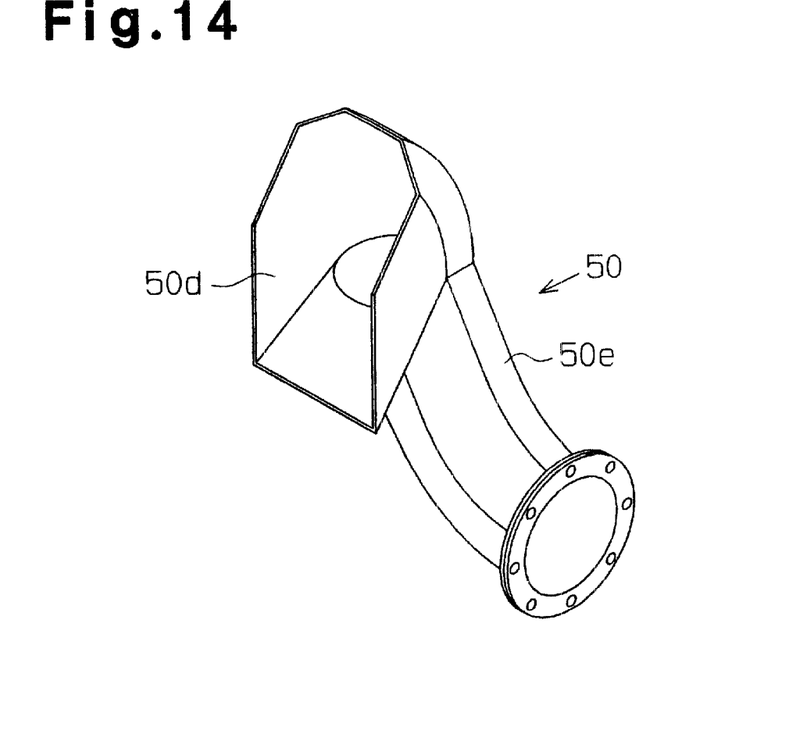
FIG. 14 is a perspective view showing a modified example of the discharge tube.
Figure 15:
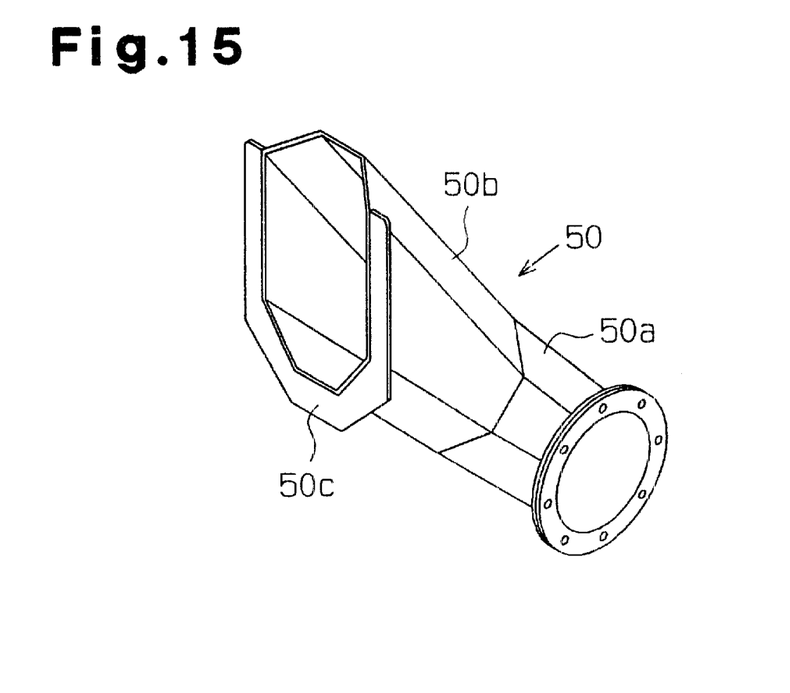
FIG. 15 is a perspective view showing a modified example of the discharge tube.

In place of the discharge tube 50 shown in FIG. 13, an elbow-shaped discharge tube shown in FIG. 14 may be used. This discharge tube has an elbow-shaped portion 50e, and a distal end opening of the elbow-shaped portion 50e is provided with a trough portion 50d. Alternatively, as shown in FIG. 15, a polygonal, elbow-shaped discharge tube 50 formed by welding a plurality of band plates, may be used.

Figure 16:
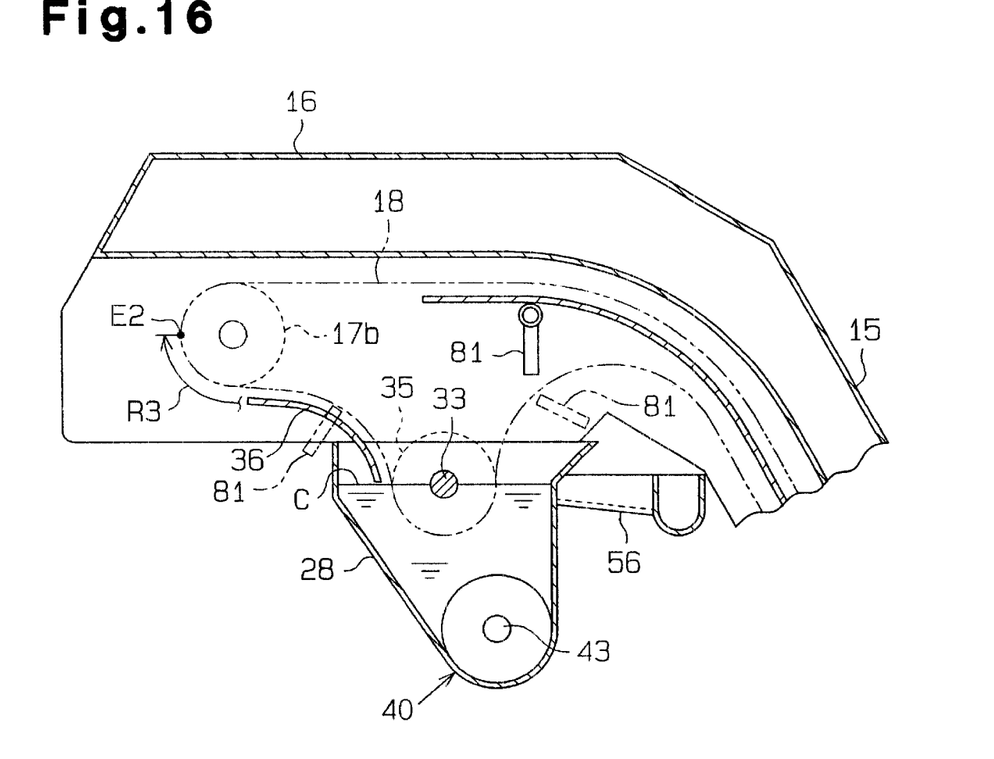
FIG. 16 is a main portion cross-sectional view showing another embodiment.

As shown by solid lines in FIG. 16, a spray nozzle 81 (liquid supply device) for the coolant liquid C is provided inside the conveying member 18, and the coolant liquid C is sprayed onto the back of the conveying member 18 through the spray nozzle 81, and the coolant liquid C may be then caused to fall into the liquid storage tank 28. Alternatively, as shown by a chain line in FIG. 16, the spray nozzle 81 may be provided outside the conveying member 18.

Before and after the conveying member 18 enters the liquid storage tank 28 in the return route R3, the nozzles 81 spray coolant liquid C on the conveying member 18 and cause the coolant liquid C to flow toward the liquid storage tank 28. Thus, in place of the spray nozzle 81 a nozzle from which coolant drops may be used.

In this case, some of chips 23 adhered to the conveying member 18 before it enters the liquid storage tank 28 are removed, and chips 23 that are not removed in the liquid storage tank 28 are removed from the conveying member outside of the liquid storage tank so that the chips 23 fall into the liquid storage tank 28. As a result, the recovery efficiency is improved and at the same time the replenishment of coolant liquid C into the liquid storage tank 28 is performed.

Figure 17:
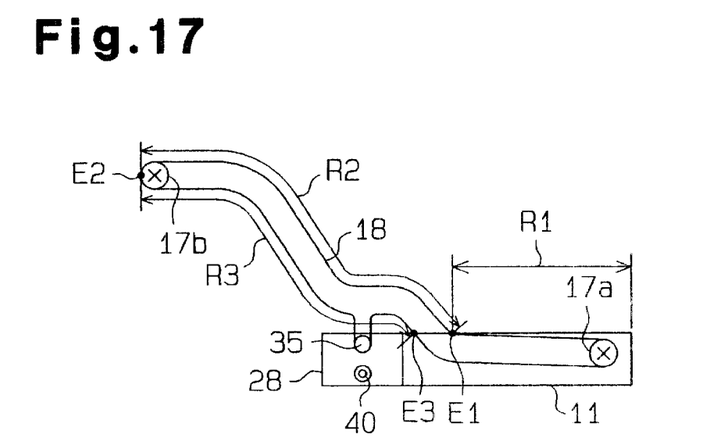
FIG. 17 is a schematic front view showing another embodiment.

As shown in FIG. 17, the liquid storage tank 28 may be provided in the vicinity of the recovery tank 11. In this case, a pipe necessary for conducting the coolant liquid C in the recovery tank 11 can be shortened, and the installation of the apparatus is facilitated.

Figure 18:
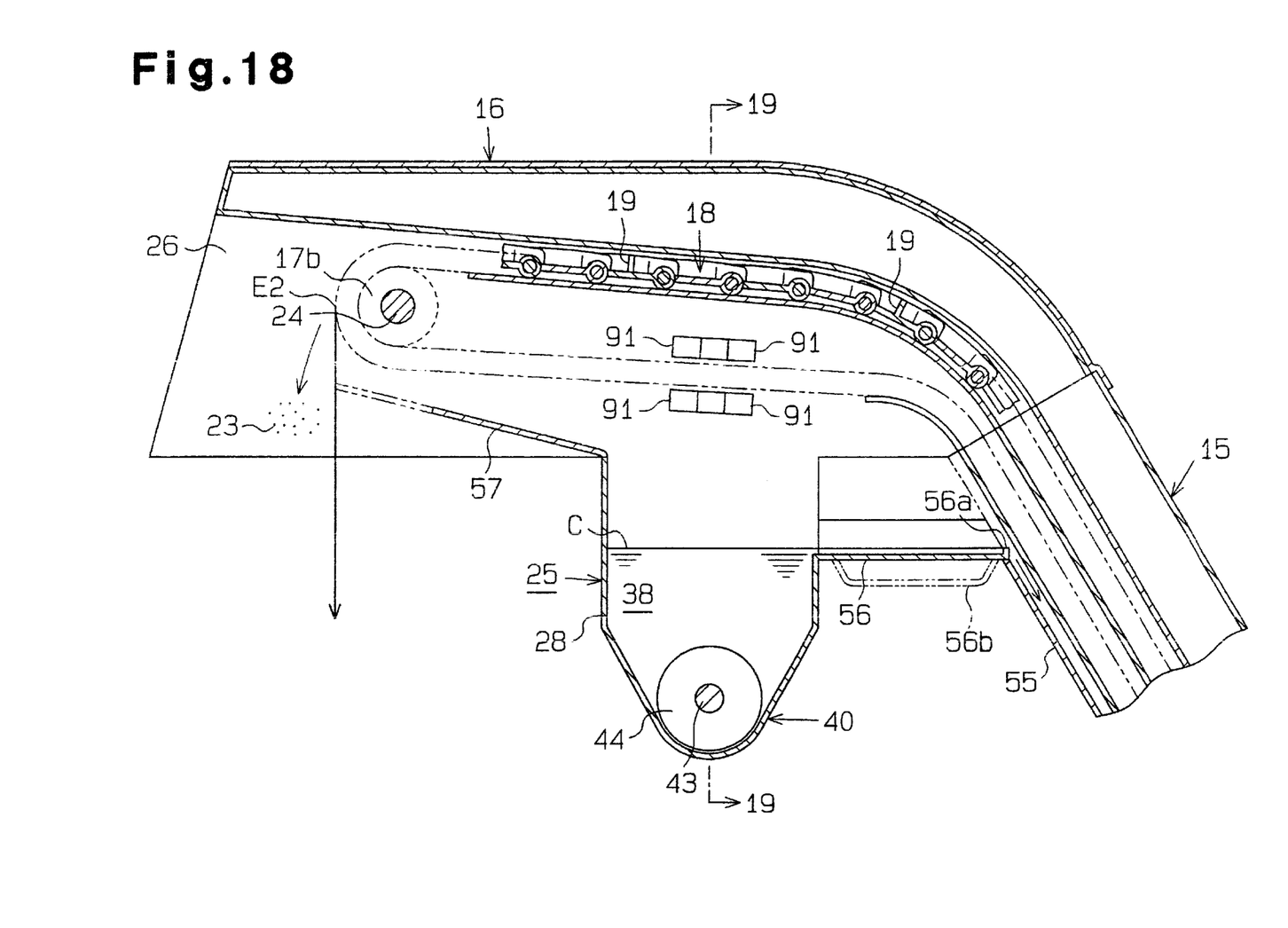
FIG. 18 is a main portion cross-sectional view showing another embodiment.
Figure 19:
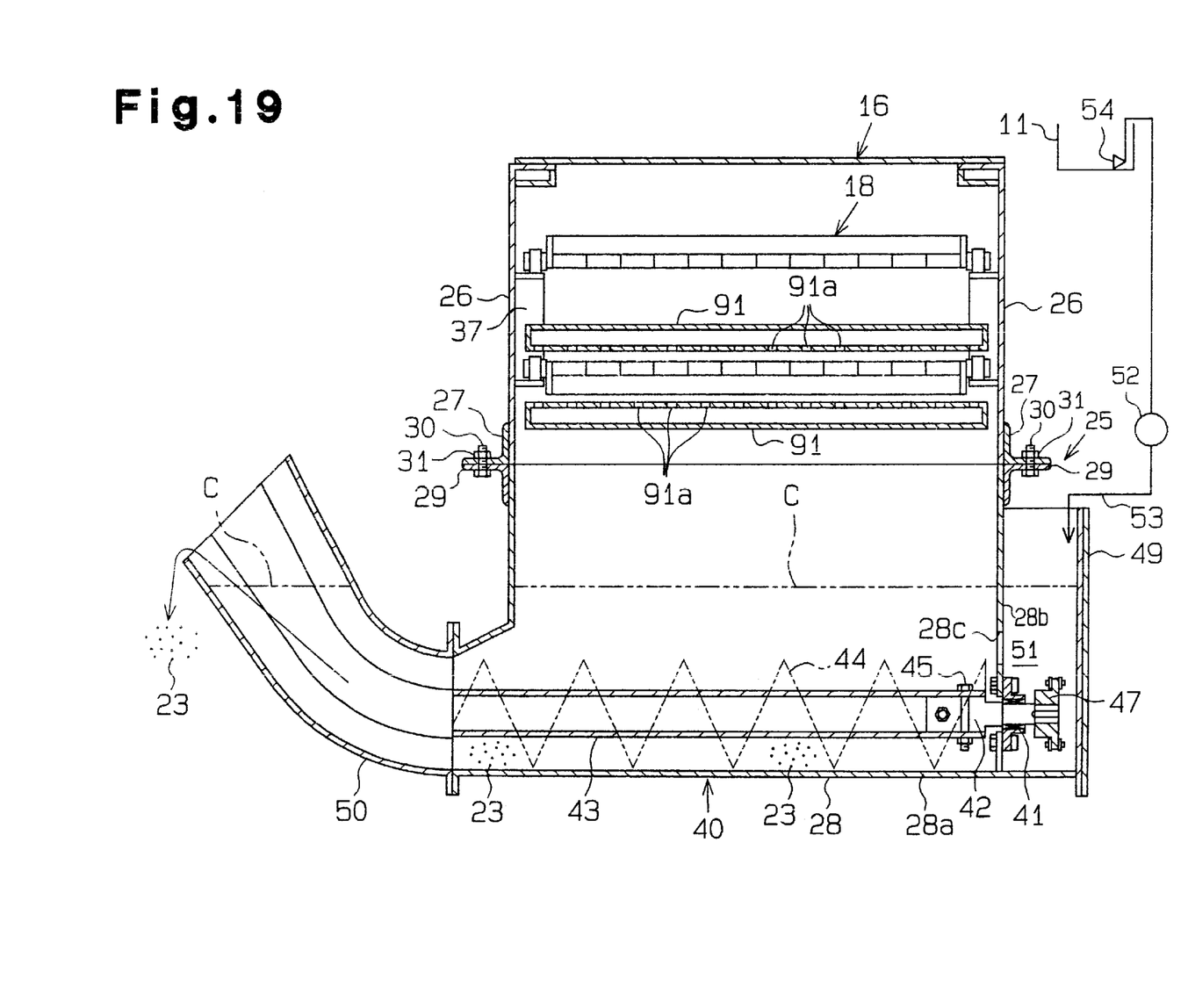
FIG. 19 is a cross-sectional view taken along the line 19—19 of FIG. 18.

In other embodiments shown in FIGS. 18 and 19, a device that reduces or removes the liquid crosslinking adhesion for adhering chips to the conveying member 18 is different from that of the embodiment of FIG. 1. That is, the embodiment of FIG. 1 has a system that causes the conveying member 18 to enter the liquid storage tank 28. However, in this embodiment, the conveying member 18 passes through the upper portion of the liquid storage tank 28 without entering it. A plurality of pipes 91 facing each other are provided on the upper and lower sides of the conveying member 18 above the liquid storage tank 28. The coolant liquid C flows out of an outlet 91a of each pipe 91 toward the conveying member 18, and the liquid crosslinking adhesion is reduced or removed by the contact with the coolant liquid C.

Figure 20:
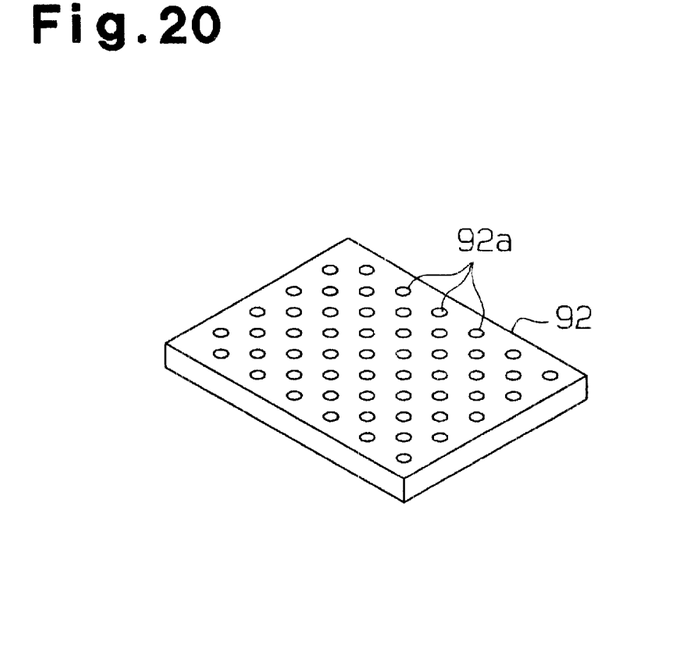
FIG. 20 is a perspective view of a nozzle showing another embodiment.

In place of the pipes 91, a flat hollow body 92 provided with a number of outlets 92a shown in FIG. 20, may be used. In the embodiments of FIG. 18 and FIG. 20 the configuration to detour the conveying member 18 in the liquid storage tank 28 is not necessary, and the structure of the apparatus is simplified and the production and assembly operations can be easily performed.

Figure 21:
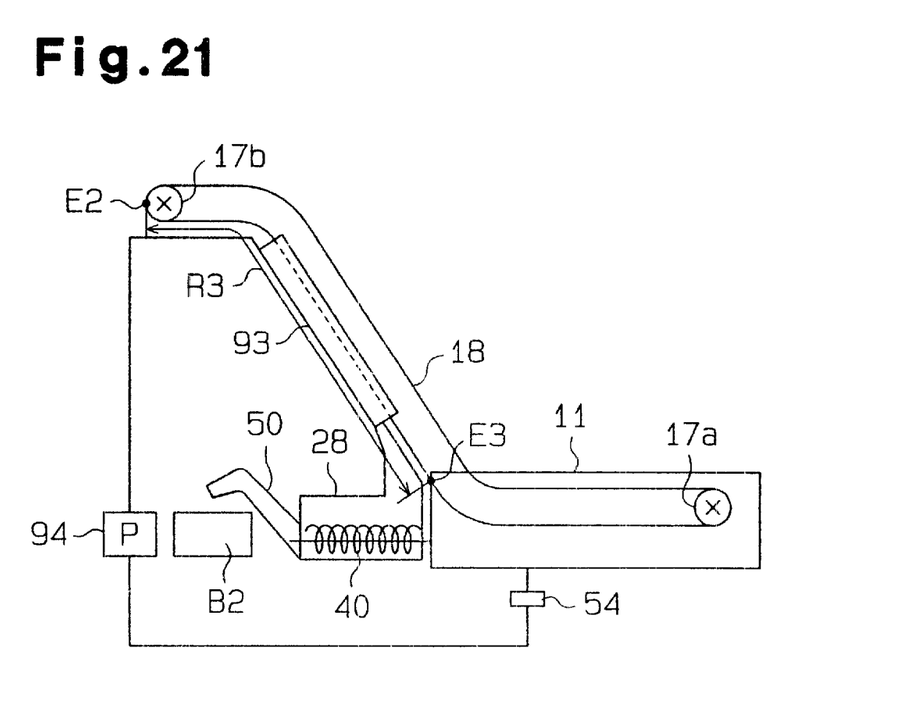
FIG. 21 is a schematic front view showing another embodiment.

As shown in FIG. 21, an inclined trough 93 is provided to form a path that is parallel with the inclined portion of the return route R3, so that the conveying member 18 passes through the interior of the inclined trough 93. Then, the coolant liquid C is pumped by a pump 94 from the recovery tank 11 through the cleaner 54 and is caused to flow in the inclined trough 93 so that the movement speed of the coolant liquid C becomes substantially the same as that of the conveying member 18. Thus, the chips adhered to the conveying member 18 are separated and recovered in the liquid storage tank 28. In this case, since the time during which the conveying member 18 is immersed in the coolant liquid C is greater, the separation efficiency of chips is improved.

Further, the discharge trough is deep, and a small discharge device, like the above-described screw conveyor 40 and discharge tube 50, can be provided at the bottom of the discharge trough 56. This discharge device is driven in cooperation with the circulating movement of conveying member 18. In this case, fine chips, which fall in the discharge trough 56, can be automatically discharged.

In place of the coolant liquid C, for example water, cleaning fluid or the like can be used.

Further, in place of the screw conveyor 40, a scraping mechanism employing a scraper, a belt conveyor, or a bucket conveyor can be used.

The discharge tube 50 may be flexible so that a discharge direction of the chips may be changed.

The sprocket wheels 35 and the screw impeller wheels 44 may be alternately provided in the liquid storage tank 28.

Industrial Applicability

According to the present invention, liquid acts on chips that remain adhered to the conveying member by the liquid crosslinking adhesion due to an oil component, and the liquid crosslinking adhesion is reduced or removed. Thus, the chips that remain adhered are efficiently removed and the durability of the conveying member and the driving mechanism is improved. Further, the degree of freedom in installing the apparatus for separating the chips that adhere is increased and the installation of the entire apparatus can be easily carried out.

What is claimed is:

1. A chip conveyor apparatus wherein chips discharged from a machine tool are received in a receiving region and are conveyed to a discharge position, which is spaced from the receiving region, wherein a path from the receiving region to the discharge position is defined as a forward route, and a passage from the discharge position to the receiving region is defined as a return route, the apparatus comprising:
    an endless conveying member for conveying the chips from the receiving region, wherein the endless conveying member discharges the chips at the discharge position, and the conveying member is circulated in a predetermined direction;
    a separation apparatus located in the return route, wherein the separation apparatus separates chips from the conveying member by causing a liquid to act on chips that adhere to the conveying member to reduce or remove the adhesion after the conveying member has passed the discharge position, wherein the separation apparatus comprises a liquid storage tank containing the liquid acted on the chips, and wherein the liquid storage tank includes a chip discharge device, wherein the chip discharge device includes a screw conveyor provided on the bottom portion of the liquid storage tank for discharging the chips from the liquid storage tank, and a discharge tube attached to an outer wall of the liquid storage tank, the distal end opening of the discharge tube being placed above the liquid level of the liquid in the liquid storage tank.

2. The chip conveyor apparatus according to claim 1, wherein a recovery tank is located in the receiving region, wherein a part of the conveying member passes through the recovery tank and contacts coolant liquid discharged from the machine tool together with the chips.

3. The chip conveyor apparatus according to claim 1, wherein the liquid is a coolant.

4. The chip conveyor apparatus according to claim 1, wherein the separation apparatus comprises a mechanism provided in the liquid storage tank that causes the conveying member to make a detour.

5. The chip conveyor apparatus according to claim 1, wherein the separation apparatus comprises:
    a liquid supply device, which is arranged on the return route and causes liquid to flow toward the conveying member; and
    a the liquid storage tank, which contains liquid that has flowed from the supply device, wherein chips are separated from the conveying member by contact with the liquid from the supply device, and the separated chips are collected by the liquid storage tank together with the liquid.

6. The chip conveyor apparatus according to claim 5, wherein the liquid supply device delivers liquid to the conveying member.

7. The chip conveyor apparatus according to claim 6, wherein the liquid supply device also serves as a liquid replenishing device for replenishing the liquid storage tank with liquid.

8. The chip conveyor apparatus according to claim 1, wherein the liquid storage tank is arranged in the return route, wherein the liquid storage tank contains liquid, and the conveying member enters the liquid during the return route, which causes chips to separate from the conveying member.

9. The chip conveyor apparatus according to claim 8, wherein the liquid storage tank includes an agitator for agitating the liquid.

10. The chip conveyor apparatus according to claim 9, wherein the agitator comprises a liquid supply nozzle provided to cause the liquid around the conveying member to flow in a circulatory manner.

11. The chip conveyor apparatus according to claim 9, wherein the agitator comprises a liquid supply nozzle directed toward the conveying member.

12. The chip conveyor apparatus according to claim 8, wherein the return route includes a linear part and a generally non-linear detour part, and the liquid storage tank is located in the detour part.

13. The chip conveyor apparatus according to claim 12, wherein the chip conveyor apparatus includes a trough for covering the conveying member along the forward route and the return route, and the trough has a closed distal end portion and a bottom plate having an opening, and the liquid storage tank is attached to the opening of the bottom plate.

14. The chip conveyor apparatus according to claim 12, wherein the receiving region is substantially horizontal, the forward route comprises a raised portion that lifts chips obliquely upward, and a discharge portion that transports the lifted chips to the discharge position in a substantially horizontal direction, and the return route is substantially parallel to the forward route.

15. The chip conveyor apparatus according to claim 12, wherein the chip conveyor apparatus includes a trough for covering the conveying member along the forward route and the return route and an opening, which allows the chips to fall, is provided at an end portion of the trough, and the liquid storage tank is attached to the trough.

16. The chip conveyor apparatus according to claim 15, wherein a guide for recovering liquid and chips adhered to the conveying member is provided between the distal end of the trough and the liquid storage tank.

17. The chip conveyor apparatus according to claim 16, wherein the guide is located in the vicinity of a chip discharge point.

18. The chip conveyor apparatus according to claim 16, wherein the distal end of the guide is located in the vicinity of a vertical line passing through a return point of the conveying member.

19. The chip conveyor apparatus according to claim 8, wherein the liquid storage tank is provided with a chip discharge device for discharging chips from the liquid storage tank.

20. The chip conveyor apparatus according to claim 19, wherein the liquid storage tank is provided with a liquid replenishing device, which replenishes the liquid storage tank with liquid.

21. The chip conveyor apparatus according to claim 20, wherein the replenishing device includes a pump that pumps liquid from the recovery tank, and a cleaner that cleans the liquid pumped by the pump.

22. The chip conveyor apparatus according to claim 20, wherein the liquid storage tank is provided with a liquid discharge device, which discharges excess liquid from the liquid storage tank.

23. The chip conveyor apparatus according to claim 22, wherein the liquid discharge device includes a recovery area, which permits chips to precipitate, for recovering chips between the liquid storage tank and the recovery tank.

24. The chip conveyor apparatus according to claim 23, wherein the recovery area is located in a flat trough, and the excess liquid passes through the flat trough at a slow speed.

25. The chip conveyor apparatus according to claim 24, wherein the trough is provided with an end plate for preventing fine chips from flowing into the recovery tank.

26. The chip conveyor apparatus according to claim 10, wherein the trough is provided with a concave portion for collecting fallen chips.

27. The chip conveyor apparatus according to claim 22, wherein the chip conveyor apparatus further comprises a recovery tank arranged in the receiving region, and the liquid discharge device causes excess liquid to flow into the recovery tank.

28. The chip conveyor apparatus according to claim 19, wherein the chip discharge device is driven in cooperation with the circulating movement of the conveying member.

29. The chip conveyor apparatus according to claim 28, wherein the conveying member and the discharge device are operated by different motors.

30. The chip conveyor apparatus according to claim 28, wherein an auxiliary liquid storage tank is connected to the liquid storage tank, and a part of the driving mechanism of the chip discharge device is contained in the auxiliary liquid storage tank.

31. The chip conveyor apparatus according to claim 28, wherein the chip conveyor apparatus includes a single motor for operating the conveying member and the chip discharge device.

32. The chip conveyor apparatus according to claim 31, wherein the chip discharge device is directly driven by the motor.

33. The chip conveyor apparatus according to claim 28, wherein the chip conveyor apparatus includes a recovery box for receiving chips that fall from the discharge position, and the chip discharge device includes a conveyor and a discharge tube, which leads chips discharged from the chip discharge device to the recovery box.

* * * * *